US008128469B2

(12) United States Patent
Hormigo Cebolla et al.

(10) Patent No.: US 8,128,469 B2
(45) Date of Patent: Mar. 6, 2012

(54) MEDIA SYSTEM AND METHOD

(75) Inventors: Jesus Hormigo Cebolla, Malaga (ES);
Jamil Nadim El Imad, London (GB)

(73) Assignee: Virtually Live Ltd., Tortola (VG)

( * ) Notice: Subject to any disclaimer, the term of this patent is extended or adjusted under 35 U.S.C. 154(b) by 0 days.

(21) Appl. No.: 12/921,052

(22) PCT Filed: Mar. 5, 2009

(86) PCT No.: PCT/GB2009/050222
§ 371 (c)(1),
(2), (4) Date: Sep. 3, 2010

(87) PCT Pub. No.: WO2009/109784
PCT Pub. Date: Sep. 11, 2009

(65) Prior Publication Data
US 2010/0331065 A1 Dec. 30, 2010

(30) Foreign Application Priority Data

Mar. 7, 2008 (GB) .................................. 0804274.9
Apr. 30, 2008 (EP) .................................. 08155517

(51) Int. Cl.
*A63F 9/24* (2006.01)
*A63F 13/00* (2006.01)

(52) U.S. Cl. .................. 463/4; 345/473; 345/42; 345/7; 345/16; 463/9; 705/1; 455/517; 235/382; 380/44

(58) Field of Classification Search .................. None
See application file for complete search history.

(56) References Cited

U.S. PATENT DOCUMENTS 6,380,890 B1 * 4/2002 Smith et al. .............. 342/357.31
6,999,083 B2 * 2/2006 Wong et al. .................. 345/473

2001/0003715 A1 * 6/2001 Jutzi et al. ...................... 463/40
(Continued)

FOREIGN PATENT DOCUMENTS
EP 0773514 5/1997
(Continued)

OTHER PUBLICATIONS

Mafalda Pereira; International Search Report in PCT/GB2009/050222; Apr. 7, 2009; 3 pages; European Patent Office; Rijswijk, Netherlands.

(Continued)

*Primary Examiner* — Paul A. D'Agostino
(74) *Attorney, Agent, or Firm* — Florek & Endres PLLC

(57) ABSTRACT

An interactive media system configured to present a substantially real-time simulation of an actual live event involving a moveable object in an arena, the system comprising: a tag attachable to a moveable object involved in an actual live event in an arena; one or more base stations located relative to the arena and operable to receive a signal from the tag; a location platform configured to determine the location of the tag in the arena based on the signal received from the tag by the or each base station, and to output location data representing a location of the tag in the arena; a virtual world environment unit to simulate the actual live event including the arena, the object, and movement of the object in the arena using the location data for the tag; and an access interface in communication with the virtual world environment unit, the access interface being arranged to provide a user with access to the simulated arena and to permit the user to observe the simulated event in substantially real-time.

9 Claims, 3 Drawing Sheets

U.S. PATENT DOCUMENTS

Figure 1:
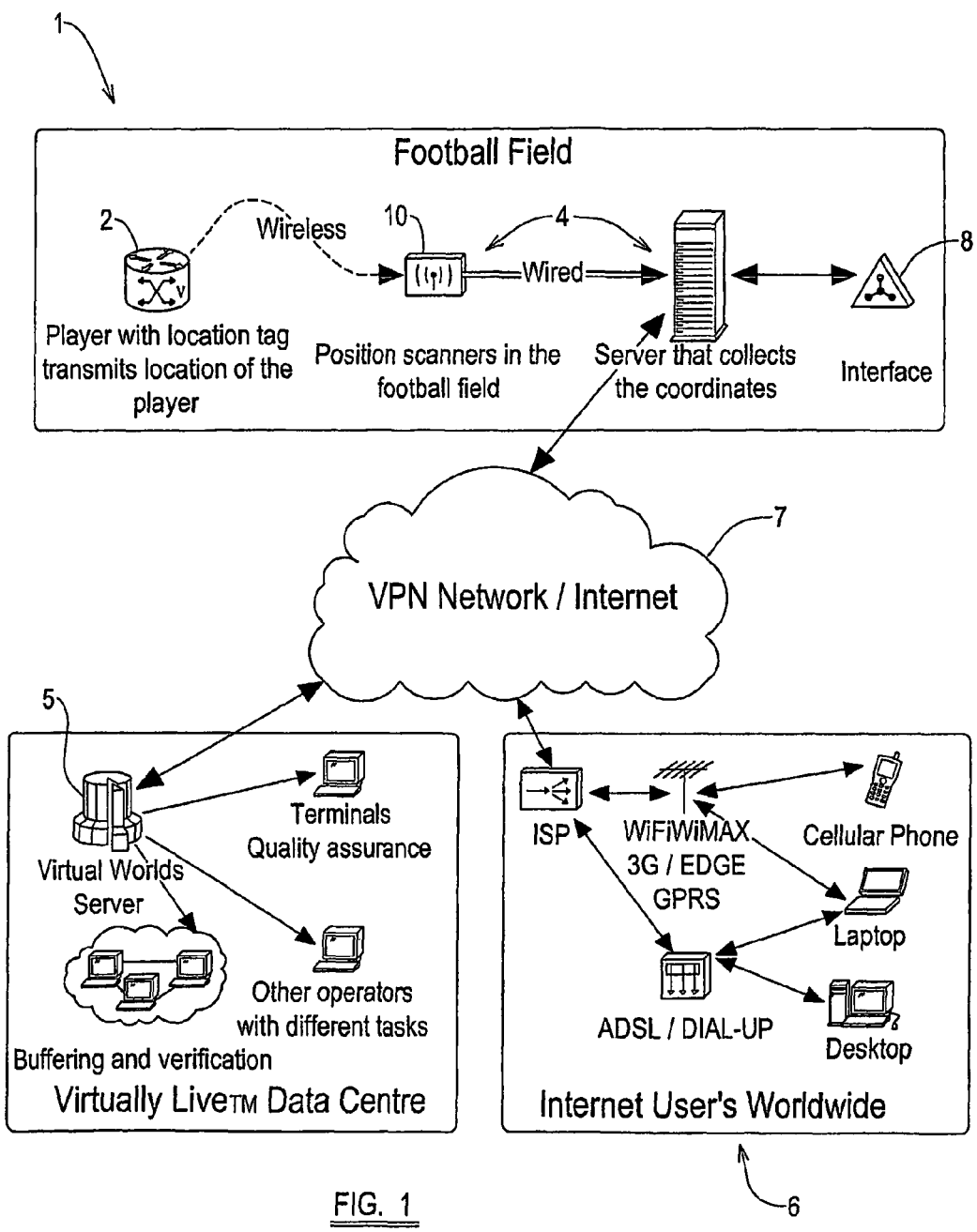

| | | | |
|---|---|---|---|
| 2002/0183961 A1* | 12/2002 | French et al. | 702/150 |
| 2003/0038805 A1* | 2/2003 | Wong et al. | 345/473 |
| 2004/0178955 A1* | 9/2004 | Menache et al. | 342/463 |
| 2004/0224740 A1* | 11/2004 | Ball et al. | 463/6 |
| 2005/0110789 A1* | 5/2005 | Le Ouay | 345/419 |
| 2005/0130725 A1* | 6/2005 | Creamer et al. | 463/1 |
| 2006/0046807 A1* | 3/2006 | Sanchez | 463/9 |
| 2006/0173701 A1* | 8/2006 | Gurvey | 705/1 |
| 2006/0211462 A1* | 9/2006 | French et al. | 463/1 |
| 2007/0197247 A1* | 8/2007 | Inselberg | 455/517 |
| 2008/0026838 A1* | 1/2008 | Dunstan et al. | 463/30 |
| 2008/0092065 A1* | 4/2008 | Jung et al. | 715/757 |
| 2008/0146302 A1* | 6/2008 | Olsen et al. | 463/7 |
| 2008/0146339 A1* | 6/2008 | Olsen et al. | 463/42 |
| 2008/0161113 A1* | 7/2008 | Hansen et al. | 463/42 |
| 2008/0186330 A1* | 8/2008 | Pendleton et al. | 345/619 |
| 2008/0191009 A1* | 8/2008 | Gressel et al. | 235/382 |
| 2008/0214303 A1* | 9/2008 | Hamalainen et al. | 463/32 |
| 2009/0023489 A1* | 1/2009 | Toneguzzo | 463/16 |
| 2009/0062009 A1* | 3/2009 | Inubushi et al. | 463/42 |
| 2009/0116641 A1* | 5/2009 | Bokor et al. | 380/44 |
| 2010/0045664 A1* | 2/2010 | Ishida | 345/419 |

FOREIGN PATENT DOCUMENTS

| | | |
|---|---|---|
| EP | 1127457 | 7/2002 |
| EP | 1070265 | 11/2003 |
| EP | 0722601 | 12/2003 |
| EP | 1198274 | 5/2005 |
| FR | 2726370 | 5/1996 |
| FR | 2869709 | 11/2005 |
| GB | 2444407 | 6/2008 |
| WO | 98/46029 | 10/1998 |
| WO | 01/05476 | 1/2001 |
| WO | 02/071334 | 9/2002 |
| WO | 2006/097357 | 9/2006 |
| WO | 2006/103662 | 10/2006 |
| WO | 2007/061346 | 5/2007 |
| WO | 2008/012797 | 1/2008 |

OTHER PUBLICATIONS

European Patent Office; Extended European Search Report in European Patent Application No. 08155517.9; Sep. 9, 2008; 4 pages; European Patent Office; Rijswijk, Netherlands.

Mafalda Pereira; Interview Summary of telephonic interview held in European Patent Application No. 08155517.9; Mar. 4, 2010; 2 pages; European Patent Office; Rijswijk, Netherlands.

Mafalda Pereira; European Search Report in European Patent Application No. 08155517; Sep. 2, 2008; 2 pages; The Hague.

Mafalda Pereira; Communication Pursuant to Article 94(3) EPC in European Patent Application No. 08155517.9; Aug. 19, 2009; 6 pages; European patent Office; Rijswijk, Netherlands.

* cited by examiner

MEDIA SYSTEM AND METHOD

This application is a U.S. National Stage filing under 35 U.S.C. §371 of International Application No. PCT/GB2009/050222, filed Mar. 5, 2009, which in turn claims priority to European Patent Application No. 08155517.9, filed Apr. 30, 2008, which in turn claims priority to British Patent Application No. 0804274.9, filed Mar. 7, 2008.

This invention relates to a media system, components thereof and associated methods.

One aspect of the present invention provides an interactive media system configured to present a substantially real-time simulation of an actual live event involving a moveable object in an arena, the system comprising: a tag attachable to a moveable object involved in an actual live event in an arena; one or more base stations located relative to the arena and operable to receive a signal from the tag; a location platform configured to determine the location of the tag in the arena based on the signal received from the tag by the or each base station, and to output location data representing a location of the tag in the arena; a virtual world environment unit to simulate the actual live event including the arena, the object, and movement of the object in the arena using the location data for the tag; and an access interface in communication with the virtual world environment unit, the access interface being arranged to provide a user with access to the simulated arena and to permit the user to observe the simulated event in substantially real-time.

Preferably at least one of the one or more base stations are located inside the arena.

Advantageously, the system further comprises an optical reference unit configured to track the location of a further object in the arena optically and to output further location data representing a location of the further object in the arena, wherein the virtual world environment unit is adapted to simulate the actual live event including the further object and movement of the further object in the arena using the further location data.

Conveniently, the system further comprises one or more time stamp units arranged to associate time stamp data with the location data and the further location data such that the location data and further location data can be registered in the same time frame using the associated time stamp data.

Preferably, the system further comprises one or more additional tags attachable to respective additional objects involved in the actual live event, wherein the one or more base stations are operable to receive a signal from each respective tag; the location platform is configured to determine the location of each tag based on the signal received from that tag by the or each base station, and to output location data representing the locations of each tag in the arena; and the virtual world environment unit simulates the actual live event including the objects and movement of the objects in the arena using the location data for each tag.

Advantageously, the access interface includes a server to receive a user request to observe the simulated event and to transmit a data stream to the user, the data stream representing the simulated event and being suitable to be used to simulate the event on a user display.

Conveniently, the virtual world environment unit is configured to model one or more interactive elements with which a user may interact.

Preferably, the access interface is adapted to permit two or more users to observe the simulated event and can receive one or more interaction commands from a user which permit the user to interact with at least one other user.

Advantageously, the interaction commands are processed by the virtual world environment unit.

Another aspect of the present invention provides a location tracking system configured to track the location of a tag in an arena in substantially real-time during an actual live event, the system comprising: an array of base stations in a substantially uniform arrangement positioned relative to an arena, each base station being adapted to receive a signal from a tag and output location data relating to the received signal; and a location platform arranged to determine the location of the tag in the arena based on location data output at least one of the array of base stations in substantially real-time.

Preferably, the array includes at least three base stations.

Advantageously, the base stations of the array of base stations are substantially evenly spaced.

Conveniently, the array of base stations comprises an array of RFID tags.

Alternatively, the array of base stations comprises an array of RFID tag reader devices.

Preferably, the system further comprises an optical reference unit configured to track the location of a further object in the arena optically and to output further location data representing the location of the further object in the arena.

Advantageously, the system further comprises one or more time stamp units arranged to associate time stamp data with the location data and the further location data such that the location data and further location data can be registered in the same time frame using the associated time stamp data.

Another aspect of the present invention provides a location tracking system configured to track the location of a tag in an arena and a further object in the arena in substantially real-time during an actual live event, the system comprising: an array of base stations positioned relative to an arena, each base station being adapted to receive a signal from a tag and output location data relating to the received signal; a location platform arranged to determine the location of the tag in the arena based on location data output at least one of the array of base stations; and an optical reference unit configured to track the location of a further object in the arena optically and output location data relating to the location of the further object.

Preferably, the system further comprises one or more time stamp units arranged to associate time stamp data with the location data such that all of the location data can be registered in the same time frame using the associated time stamp data.

Another aspect of the present invention provides a virtual world environment unit operable to simulate an actual live event in substantially real-time, the simulation including a simulated arena based on library information for the arena, a simulated object in the arena, simulated movement of the object in the arena based on substantially real-time location data received by the unit for the object, and a simulated user in a virtual spectator area which is separate from the simulated arena.

Preferably, the unit is further operable to receive one or more interaction instructions from one or more users and to adapt one of the simulation of the user and an element in the virtual spectator area in accordance with the or each interaction instruction.

Another aspect of the present invention provides a method of providing a substantially real-time simulation of an actual live event involving a moveable object in an arena, the method comprising the steps of: tracking the location of a moveable object in an arena and generating location data representing the location of the object in the arena by utilising one or more base stations located relative to the arena to receive a signal from a tag attached to the moveable object, and determining the location of the tag in the arena based on the signal received from the tag by the or each base station; transmitting the location data to a virtual world environment unit; generating a simulation of the event in the virtual world environment unit using the received location data to simulate the object in a simulated arena; and permitting a user to access the simulated arena and observe the simulated event in substantially real-time.

Preferably, the step of tracking the location of a moveable object includes the step of providing at least one of the one or more base stations inside the arena.

Advantageously, the method further comprises the step of tracking a further object using an optical reference unit configured to track the location of the further object in the arena optically and to output further location data representing a location of the further object in the arena, wherein the step of generating a simulation of the event further comprises simulating the further object and movement of the further object in the arena using the further location data.

Conveniently, the method further comprises the step of associating time stamp data with the location data and the further location data such that the location data and further location data can be registered in the same time frame.

Preferably, the method further comprises the step of tracking one or more additional moveable objects in the arena and generating location data representing the location of the or each additional object in the arena by utilising one or more tags attachable to the or each respective additional object and receiving a signal from each respective tag at the one or more base stations, wherein the step of generating a simulation of the event further comprises using the location data to simulate the or each further object in the simulated arena.

Advantageously, the method further comprises the steps of receiving a user request to observe the simulated event and to transmitting a data stream to the user, the data stream representing the simulated event and being suitable to be used to simulate the event on a user display.

Conveniently, the method further comprises the step of modelling one or more interactive elements with which a user may interact.

Preferably, the method further comprises the step of permitting a user to access the simulated arena comprises the step of permitting two or more users to observe the simulated event; and the method further comprises the step of receiving one or more interaction commands from a user which permit the user to interact with at least one other user.

Advantageously, the method further comprises the step of processing the or each interaction command in the virtual world environment unit.

Another aspect of the present invention provides a location tracking method to track the location of a tag in an arena in substantially real-time during an actual live event, the method comprising: providing an array of base stations in a substantially uniform arrangement positioned relative to an arena; receiving, at a base station of the array of base stations, a signal from a tag and outputting location data relating to the received signal from the base station; and determining the location of the tag in the arena using a location platform based on the location output by the base station in substantially real-time.

Preferably, the step of providing an array of base stations comprises providing at least three base stations.

Advantageously, the step of providing an array of base stations comprises providing the base stations in a substantially evenly spaced arrangement.

Conveniently, the step of providing an array of base stations comprises providing an array of RFID tags.

Alternatively, the step of providing an array of base stations comprises providing an array of RFID tag reader devices.

Preferably, the method further comprises the steps of: tracking the location of a further object in the arena optically using an optical reference unit; and outputting further location data representing the location of the further object in the arena.

Advantageously, the method further comprises the step of associating a time stamp with the location data and the further location data such that the location data and further location data can be registered in the same time frame using the associated time stamp data.

Another aspect of the invention provides a method of tracking the location of a tag in an arena and a further object in the arena in substantially real-time during an actual live event, the method comprising: providing an array of base stations positioned relative to an arena; receiving, at a base station of the array of base stations, a signal from a tag and outputting location data relating to the received signal from the base station; determining the location of the tag in the arena using a location platform based on the location output by the base station in substantially real-time; optically tracking a further object in the arena using an optical reference unit; and outputting location data relating to the location of the further object.

Preferably, the method further comprises the step of associating time stamp data with the location data such that all of the location data can be registered in the same time frame using the associated time stamp data.

Another aspect of the present invention provides a method of operating a virtual world environment unit, the unit being operable to simulate an actual live event in substantially real-time, the method comprising the steps of: simulating an arena based on library information for the arena, simulating an object in the arena; simulating movement of the object in the arena based on substantially real-time location data received by the unit for the object; and simulating a user in a virtual spectator area which is separate from the simulated arena.

Preferably, the method further comprises the steps of: receiving one or more interaction instructions from one or more users; and adapting one of the simulation of the user and an element in the virtual spectator area in accordance with the or each interaction instruction.

Another aspect of the present invention provides a method of viewing a substantially real-time simulation of an actual event involving a moveable object in an arena, the method comprising the steps of: receiving, at a user unit, a substantially real-time simulation of a live event involving at least one moveable object in an arena; and receiving a simulation of the user in a spectator area of the simulated event, the spectator area being separate from the arena.

Figure 2:
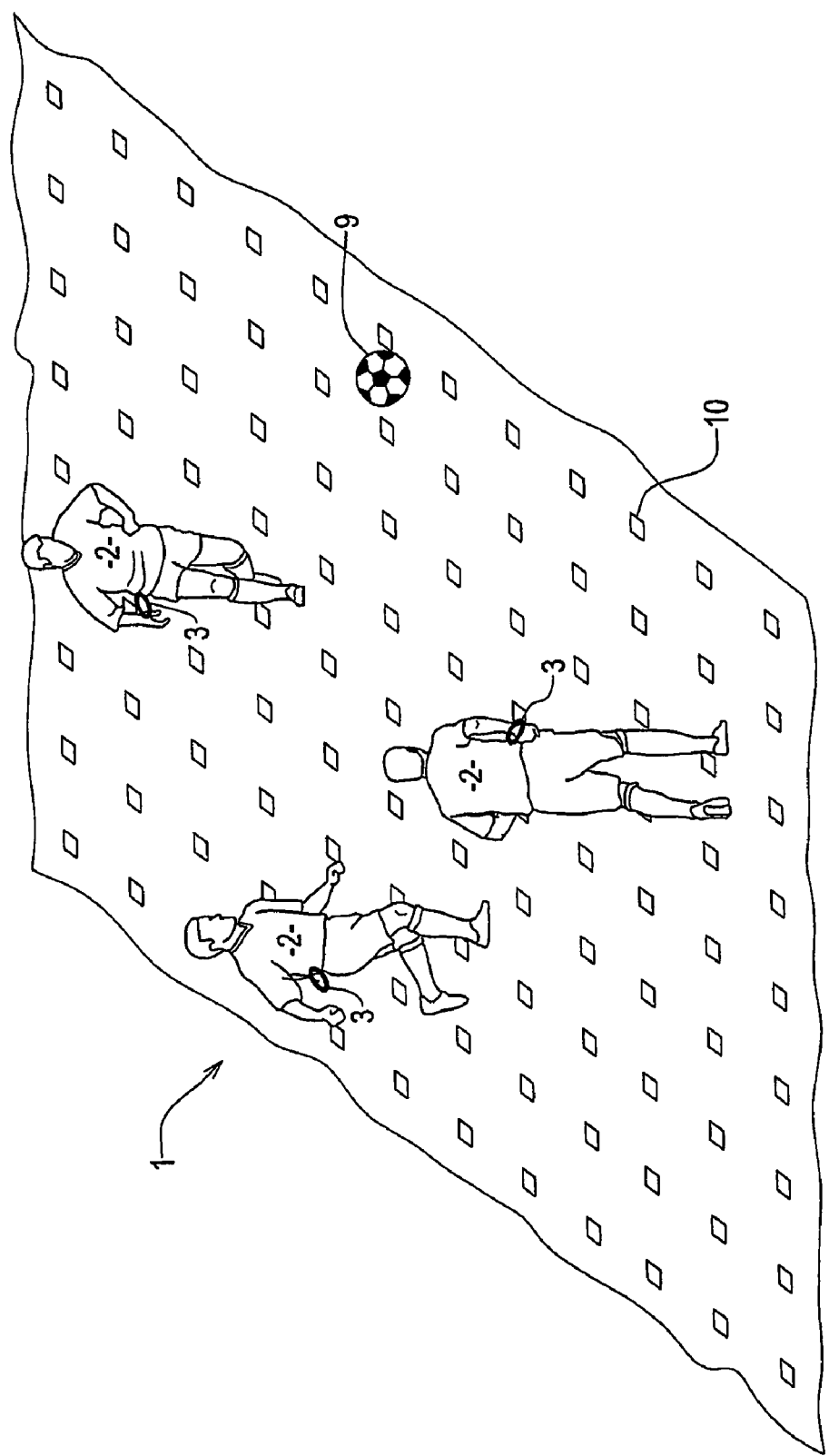
Figure 3:
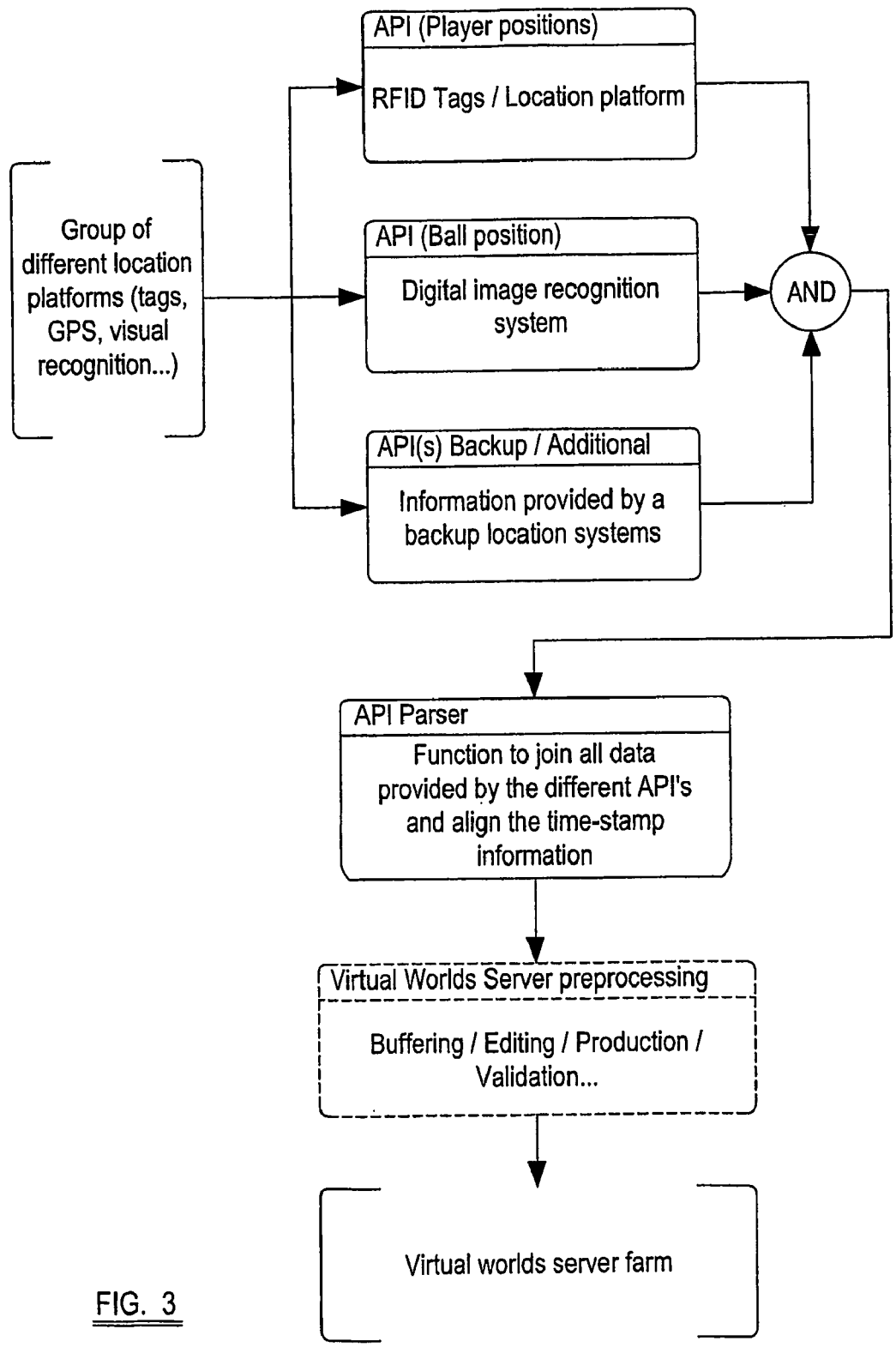

In order that the present invention may be more readily understood, embodiments thereof will now be described, by way of example, with reference to the accompanying drawings, in which:

FIG. 1 is a schematic representation of the system architecture of an interactive media system embodying the present invention; and FIG. 2 is a schematic representation of elements of the interactive media system of FIG. 1; and FIG. 3 is a schematic representation of the system of an embodiment of the present invention.

An interactive media system embodying the present invention comprises four main elements: a real world arena 1 having movable objects 2 which are location-tagged 3, the location of one or more movable objects 2 being derived by a location platform 4; a virtual environment comprising a computer-based simulated environment shared by many users and hosted on a local server 5 or hosted as a distributed network 6; users connected to and allowed access to the virtual environment over a communication network; and an interface 8 to furnish the virtual world environment with data from the real world arena.

Location Platform

An arena 1 existing in the real world comprises a 3-D space in which a live activity takes place and which has a 3-D co-ordinate system allowing any object 3, 9 in the arena 1 to have its location specified. Examples of arenas 1 are sporting arenas such as a motor racing circuit, a sporting stadium, a concert venue, a ski or winter sports course or circuit, a maritime environment in which a maritime event is taking place, the skies in which an aerobatic or aero-racing event is taking place and more confined spaces like a boxing ring or a snooker or pool table. All of these arenas 1 comprise the area where the actual activity is taking place as well as the environment around the arena in which spectators may observe the live event.

Objects 2, 9 taking part in the real world event are movable and comprise a mixture of animate objects and inanimate objects. In the example of a snooker table, the inanimate objects comprise the balls and the cue and the animate objects comprise the respective players or even portions of the players such as their hands, torso, fore-arms and head.

A location tag 3 is attached to a movable object 2. Preferably, respective location tags 3 are attached to all of the movable objects 2, 9 in the arena 1. A location tag 3 may be attached to an object 2 by physical attachment, being strapped to the object 2, 9, being inserted into the object 2, 9, or being formed as part of the object 2, 9. The location tag 3 is associated with the movable object 2, 9 during the course of the live event and its function is to provide a means by which the location of the object 2, 9 within the real world arena 1 can be identified. A base station 10 is located in or around the arena 1 to receive signals from the location tag 3. The form of the base station 10 is dictated by the form of the location tag 3 or tags 3.

In one example, the location tag 3 is an active RFID tag. In other examples, the location tag 3 is a passive RFID tag. In another example, the location tag 3 comprises a GPS receiver. In a further example, the location tag 3 is a radio transmitter. The location tags 3 send a signal to the base station 10, which signal can be interpreted by the base station 10 to derive location information for that tag 3. The tag 3 may send more than one type of signal and/or a combination of signal types. The signal spectrum is radio frequency, optical, ultrasonic or any other form of signal operable to communicate with a base station 10.

The tag 3 may be a reflective marker which is configured to reflect a signal which is generated elsewhere and directed towards the tag 3 and/or more generally directed towards the arena 1. A suitable reflective marker may be configured to reflect a specific signal frequency or range of signal frequencies. Such tags 3 may be attached or coupled to animated objects and inanimate objects. The signal reflected from a tag 3 of this sort may be detected by the location platform 4. The signal may be a radio signal or an optical signal or any other suitable form of electromagnetic signal. The tag 3 may form part of the object to which it is attached or may be part of the clothing worn by an animate object. The tag 3 could be, for example, an entire item of clothing (such as a shirt).

In some embodiments, there is no separately identifiable tag 3 as such, but the entire animate or inanimate object is optically tracked—in other words, the object or a part thereof is the tag 3. In some cases this is achieved by tracking the movement of areas of contrast in an image (which may be assumed to be or registered as animate or inanimate objects for tracking). Other more complex image analysis techniques may be used to identify and track animate and inanimate objects in an image. In these embodiments, the location platform may automatically designate detected objects for tracking. The automatic designation may be supplemented or replaced by manual intervention by a user to designate objects for tracking within an image or series of images.

The location platform 4 derives the location of the tag 3 from signals received from the location tag 3, the base station 10 or both and outputs location data representing a location of the tag 3 in the 3-D co-ordinate system of the real world arena 1.

The location platform 4 may in some examples comprise the base station 10, or a plurality of base stations 10, where the base station 10 or base stations 10 receive sufficient information from the signals from the location tag 3 to derive the location of the tag 3 and output location data representing the location of the tag 3 in the co-ordinate system.

In the example where the location tag 3 is a GPS receiver, the tag 3 is also operable to transmit a radio signal to a base station 10 or location platform 4 which can then readily derive the location of the tag 3 from the received signal.

Active, battery powered, location tags 3 and passive location tags 3 are configured as parts of clothing or shoes. The antenna loops and circuiting are provided as flexible elements which are interwoven with or adhered to the clothing or shoe fabric. In this manner, the location tag 3 becomes an integral part of the ordinary apparel worn by a participant. This is important so that the performance and experience of the participant is not influenced or impaired in any way by the presence of a location tag 3 or tags 3.

In one embodiment, the antenna loop of a location tag 3 is formed as part of the numbers applied to the back of a participant's shirt. The collar area is also a good location for embedding an antenna loop or other flexible circuiting of a location tag 3.

The location platform 4 in one example derives the location of a tag 3 with reference to an array of base stations 10 fixed at known locations throughout the arena 1. In this example, the location tag 3 may be a passive RFID tag 3. All the base stations 10 transmit a signal to the location tag 3 and the passive tag 3 reflects a unique signal to all the base stations 10. The reflected signal of greatest strength received by a base station 10 is most likely to be received by the nearest base station 10 to that passive tag 3. The location platform 4 deems the location tag 3 to be in closest proximity to that base station 10 and the location platform 4 derives the location of the location tag 3 as being the location of that base station 10 (which is of known location). The accuracy of such a system is determined by the proximity of the base stations 10 to one another in their array and obviously requires a very large number of base stations 10 to determine a reasonably accurate position of the location tag 3. Such a system is also affected by the orientation of the tag 3 which alters signal strength.

Another example is an almost inverse system in which an array of passive RFID transponders 10 are sited at fixed known locations in a grid or the like in and around the arena 1. The location tag 3 transmits a signal to the RFID passive transponders 10 and receives reflected signals from all of the passive RFID transponders 10 (or at least those in range). The location tag 3 itself sends data concerning the reflected signals, or the reflected signals themselves, to the location platform 4. The reflective signal of greatest strength represents the most likely closest RFID transponder 10 to the location tag 3 so the location platform 4 derives the location of the location tag 3 as being the location of that passive RFID transponder 10 in the array.

In another example, a fixed set of base stations 10 or cell stations 10 can be provided in or around the arena 1. In a learning process, an RFID location tag 3, preferably passive but it may also be active, is moved throughout the live arena 1 in an ordered manner and the signal characteristics received by the base stations 10 are logged for many locations of the location tag 3. This provides a map showing the signal characteristics at the logged locations—or a look-up table. In use, the signal characteristics of a location tag 3 are noted by the location platform 4 and entered into the map or look-up table and the best match tag location for those signal characteristics is returned by the map/look-up table thereby deriving the location of the tag 3.

The base station or stations 10 can use angle of arrival techniques to determine an azimuth and an elevation of an uplink signal from a location tag 3 at more than one base station 10 and that information can be used together with the same information from other base stations 10 to create bearings for the location of a tag 3 and hence derive the location of the tag 3 from the bearings.

Time of arrival techniques may also be used to determine the location of the location tags 3 in the arena 1 but such systems are difficult to implement because of the absolute synchronicity required to provide accurate positioning information. GPS is an example of a time-of-arrival technique.

Time-difference-of-arrival (TDOA) techniques can be used to derive an hyperbola of possible locations of the location tag 3 from each base station. The intersection of the hyperbolae can be used to determine the precise location of a location tag 3.

The location platform 4 can use a combination of some or all of the above techniques to derive location information for the location tag 3. Using a combination of techniques improves the redundancy of the system and the accuracy thereof. For example, a time-difference-of-arrival system can be used in conjunction with an angle-of-arrival system to identify a unique location solution.

Weight considerations and weight distribution considerations should be taken into account when selecting a location system to use with a movable object. The robustness of the location system should also be considered as inanimate objects such as balls are likely to experience significant impacts and accelerations during a live event. Passive RFID tags 3 may thus be better suited to such high impact environments than active location tags 3 or transceivers 3 which, although containing substantially only solid-state components, are still susceptible to damage.

As previously stated, the signals between the location tags 3 and the base station 10 are radio, optical, ultrasonic or any combination thereof. These signals include signals which originated outside of the tag 3 are reflected by the tag 3. The signals which originated outside of the tag 3 may be encoded with a particular frequency (to enhance the intensity of the signal reflected by a specific tag 3 or group of tags 3) and/or a particular sequence of pulses.

Clearly, there are likely to be a plurality of location tags 3 so the signals between the location tags 3 and base stations 10 are coded or otherwise multiplexed to allow the plurality of location tags 3 to co-exist and have their own individual signals sent to the location platform 4 and the location of each unique tag 3 derived therefrom. The individual signals identifying the location of a tag 3 are time-stamped or the signal arriving at the location platform 4 is time-stamped at the location platform 4. The time-stamped location information can be used downstream to collate the location of individual tags 3 at the same time.

In one example, all of the location tags 3 encode a unique identifier or signature in their signal. In other examples, the unique identifiers are provided in an array of RFID transponders in and around the arena 1 so that the location tag attached to the movable object 2 receives unique signals from each of the transponders 10 in the array and the location tag 3 is then operable to transmit signals to a base station or the location platform 4. The location platform 4 derives from the received signals which of the unique transponders 10 in the array the location tag 3 is closest to and hence determines the location of the location tag 3 as being at that unique transponder 10.

The location tag 3 and the base station 10 may be combined to comprise a location system which delivers telemetry information to the location platform 4. An example of such a system is where the location tag 3 is configured as a GPS receiver.

In cases where the inanimate object 9 to be tagged is very fast moving, it may not be appropriate to determine the position of the object 9 by radio-positioning techniques. A somewhat different style of location platform 4 and location tag 3 is required. Optical scanners are used as the base stations in and around the arena 1 and the location tag 3 comprises the colouring or reflective coating of the inanimate object. The colouring or coating is tuned to be identified by the optical scanner. In one example, a ball 9 is tracked by optical scanners operating in a narrow spectrum and the ball 9 is coloured or coated so as to reflect light in the narrow spectrum detectable by the optical scanners. Using a combination of optical scanners and triangulation techniques, the accurate position of the fast-moving inanimate object can be detected and derived by the location platform 4.

The location platform 4 is configured as a server which collects the locations (and hence co-ordinates) of all the tagged objects 2, 9 in the real world arena 1 in real time. The location platform server 4 verifies the incoming data and discards any corrupt packages of information. Importantly, the location platform server 4 also standardises the incoming data from the different types of location sensors and consolidates the information into a single co-ordinate system.

Time-stamping becomes especially important when location information is derived from a number of different sources. For example, location information for each of the participants 2 in a game is derived from a single system using a plurality of RFID transponders, one tagged to each participant. In the same scenario, the ball 9 or other game object has its location determined and tracked by a separate system, in this case using optical scanners, recognition techniques and tracking to determine the location of the ball 9 and subsequently track the ball 9. The location of the ball 9 is thus known in one system and the location of the participants 2 is known in another system. In order to collate all the location information in a common time reference, time-stamping is used in each system with a common time source. The result is that the different location signals or information for any participant 2 or object 9 in the arena is representative of its location at any given time and all the locations are known for the participants 2 and objects 9 relative to one another. Taking this contemporaneous location information allows the locations of all participants and objects to be re-created by rendering or representation in 2-D or 3-D, at any point in time or for a series of times. Indeed, an entire game may thus be re-created after the event in terms of the location and the participants 2 and the objects 9 in the game.

The location platform 4 is also used to communicate the parameters of the respective arena 1. For example, where the arena 1 includes a playing surface, the dimensions and co-ordinates of key landmarks on the playing surface such as corner points, area boundaries, goal positions and centre spot for a football pitch are stored on the location platform 4. For a motor racing circuit as the arena 1, the location platform 4 would store the track boundaries, extent of the pit lane, the start grid and the finish line.

Application Protocol Interface (API)

The application protocol interface (API) is connected to and fed by the location platform server or servers 4 in the case of there being many location platforms. The location platform server streams to the API interface the unique location tag identities together with the location co-ordinates for each respective location tag 3 in substantially real time. The interface also has a number of containers for each of the unique location tag identifiers which hold the attributes associated with the object that is tagged by that location tag. For example, if the tagged object is an individual or player 2, then one attribute is the player's name. Other attributes may be the side of the player 2 and whether the player 2 is in home or away kit. The attributes for an object are associated with that unique identifier and are transmitted with the unique identifier and the location co-ordinates to a virtual world server 5.

Since location information is received substantially in real time, any time stamping of the received signals from plural location platforms may be time-stamped at the API.

The interface also has containers for other attributes associated with the arena or the weather or conditions at the time. For example, the type or condition of the playing surface may be stored as an attribute and the prevalent weather conditions, temperature, location of the sun and the like may also be stored as attributes for the arena. These attributes would also be accessible from and are helpfully transmitted to a virtual world server 5. These attributes are also helpfully time-stamped, although to a lower resolution.

The information contained in the interface is deliberately buffered for a predetermined time interval so that the data can be verified, errors corrected and further attributes added to the data to be streamed therefrom. At very most, the delay is a matter of seconds.

The Communication Network

The communication network 7 linking various elements of the interactive media system embodying the present invention is the Internet. However, bespoke networks or private networks are also utilised in other examples. In one example, a VPN network is used over the Internet 7. In this example, a VPN network connection network is established between the API interface and a virtual world server 5.

The Virtual World Server

The virtual world server 5 is a single server in this example. In other examples, the server 5 is a distributed network. In one example, clients for the virtual world environment are installed on end-user computing devices such as desktop computers, lap-top computers, PDA's or cell phones, each connected through the VPN network via an Internet service provider and respective wired or wireless network connections. The clients on the end-user computers allow access through the VPN network to the virtual world server 5.

There are many examples of virtual world environments and those that concern us comprise a computer-based simulated environment intended for its users to inhabit and interact with one another as avatars which are graphically-rendered representations of the residents of that virtual world.

Such virtual worlds or virtual environments are also known as collaborative virtual environments, immersive virtual environments, massively-multiplayer on-line games. Multi-user domains are more text based fore-runners to virtual worlds as such and are probably not relevant here.

Specific examples of virtual environments are Second Life (Registered trade mark of Linden Lab), There and Teen Second Life (TSL).

The virtual environment consists of a combination of Things which may be avatars, portals, artifacts and rooms. Users of the system, or residents as they are sometimes better known, can add properties and methods to instances of these objects. One simple way of developing objects is to inherit properties from other objects. In the virtual environment of this example of the invention, the real world arena is stored in the virtual world server as an object in its own right. Some of the properties of that object may be the same as the real world arena but this is not essential. For example, if the real world arena has 30,000 seats, it may be that the virtual environment object modelling the arena has 100,000 seats. The properties of the object can be dictated by an administrator.

It is also possible for a multiple object to be modelled on the one arena, each with slightly different properties. Thus, the arena-side advertisements in one object might be in English, whereas in the other objects, the advertisements could appear in other languages such as German, Japanese or Chinese. These properties may be applied to the object (the modelled arena) at the host server or alternatively can be applied at the client installation and may therefore be user specific.

In any event, at least one object is stored in the virtual environment server which is a model of the real world arena having a similar 3-D co-ordinate system, at least when graphically rendered.

A user of a virtual environment, or resident when in the virtual environment, views a 3-D graphically rendered image of the environment, usually from a first person perspective. In this example, access to the virtual environment is restricted to a predetermined resident allowed to relevant sections of the virtual environment upon payment of a subscription or upon payment of a one-off charge for the duration of an event. Access for that resident/user is then enabled. Access is controlled by an administrator or a system with administrator rights. Access to the whole of the modelled arena or only specific areas of the modelled arena may be enabled and so a resident can be restricted to a certain seat in a stadium, the touch line of a playing field or a specific aerial view. Access may be granted to the whole of the arena—access all areas—in which case the resident is able to experience being part of the real live event by walking onto a playing surface and following a ball or, in the case of a racing circuit, driving a car alongside a real-life racing driver.

An access interface comprising in one example the client software on a user computational device is in communication with the virtual environment server and, when enabled, gives a resident of the virtual world environment access to the virtual world environment and access to the arena in the virtual environment in which the moveable real world object is being modelled in substantially real time. The access interface is controlled by an administrator or by an automatic system having administrator rights. The resident corresponds to a real world entity such as an individual or, in the case of many individuals gathered before a single display, many individuals, and the resident provides a first person view to the real world entity allowing the modelled movement of the real world objects to be observed via the access interface in substantially real time. Substantially real time means that the delay in observing the real time event is only a very small delay comprising a matter of seconds at most and made up of normal telecommunication delays and buffering of the data for error checking and consolidation purposes at the location platform server and API interface.

Only a very small amount of data concerning the location of the moveable objects in the real life event need be transmitted to the virtual world server so that a tiny amount of bandwidth is used to render in 3-D, but also possibly only in 2-D, a graphical representation of the live event on a display device of the resident/user. This combination of technologies produces an incredibly realistic representation of a real time event with only a tiny amount of delay, of the order of seconds, and allows users to be presented with a customised or tailored view of the real life event.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An interactive media system configured to present a substantially real-time simulation of an actual live event involving a moveable object in an arena, the system comprising:
   a. a tag attachable to a moveable object involved in an actual live event in an arena;
   b. one or more base stations located relative to the arena and operable to receive a signal from the tag;
   c. a location platform configured to determine the location of the tag in the arena based on the signal received from the tag by the or each base station, and to output location data representing a location of the tag in the arena;
   d. a virtual world environment unit operable to create a simulation of the actual live sporting event in substantially real-time, the simulation including:
      i. a simulated arena based on library information for the arena;
      ii. a simulated object in the arena, said object being involved in the actual live event;
      iii. simulated movement of the object in the arena based on substantially real-time location data received by the unit for the object;
      iv. a simulated virtual spectator area which is separate from the simulated arena; and
      v. a simulated user in the simulated virtual spectator area, whereby the user is permitted to observe the simulation of the actual live event and to provide interaction commands which permit the user to interact with at least one other user; and
   e. an access interface in communication with the virtual world environment unit, the access interface being arranged to provide the user with access to the simulated arena and to permit the user to observe the simulated event in substantially real-time.

2. A system according to claim 1, wherein the signal received from the tag is an optical signal.

3. A system according to claim 1, further comprising an optical reference unit configured to track the location of a further object in the arena optically and to output further location data representing a location of the further object in the arena, wherein the virtual world environment unit is adapted to simulate the actual live event including the further object and movement of the further object in the arena using the further location data.

4. A system according to claim 1, further comprising one or more additional tags attachable to respective additional objects involved in the actual live event, wherein
   a. the one or more base stations are operable to receive a signal from each respective tag;
   b. the location platform is configured to determine the location of each tag based on the signal received from that tag by the or each base station, and to output location data representing the locations of each tag in the arena; and
   c. the virtual world environment unit simulates the actual live event including the objects and movement of the objects in the arena using the location data for each tag.

5. A system according to claim 1, wherein the access interface includes a server to receive a user request to observe the simulated event and to transmit a data stream to the user, the data stream representing the simulated event and being suitable to be used to simulate the event on a user display.

6. A system according to claim 1, wherein the access interface is adapted to permit two or more users to observe the simulated event and can receive one or more interaction commands from a user which permit the user to interact with at least one other user.

7. A system according to claim 3, further comprising one or more time stamp units arranged to associate time stamp data with the location data and the further location data such that the location data and further location data can be registered in the same time frame using the associated time stamp data.

8. A system according to claim 6, wherein the interaction commands are processed by the virtual world environment unit.

9. A method of providing a substantially real-time simulation of an actual live event involving a moveable object in an arena, the method comprising the steps of:
   a. tracking the location of a moveable object in an arena and generating location data representing the location of the object in the arena by utilizing one or more base stations located relative to the arena to receive a signal from a tag attached to the moveable object, and determining the location of the tag in the arena based on the signal received from the tag by the or each base station;
   b. transmitting the location data to a virtual world environment unit;
   c. generating a simulation of the event in the virtual world environment unit comprising the steps of:
      i. simulating an arena based on library information for the arena;
      ii. simulating an object in the arena, said object being involved in the actual live event;
      iii. simulating movement of the object in the arena based on substantially real-time location data received by the unit for the object;
      iv. simulating a virtual spectator area which is separate from the simulated arena;
      v. simulating a user in the virtual spectator area; and
      vi. permitting the user to observe the simulation of the actual live event, and to provide interaction commands which permit the user to interact with at least one other user; and
   d. permitting the user to access the simulated arena and observe the simulated event in substantially real-time.

* * * * *